Oct. 21, 1952      W. A. HYLAND ET AL      2,614,850
FERTILIZER DISTRIBUTOR
Filed Feb. 25, 1950
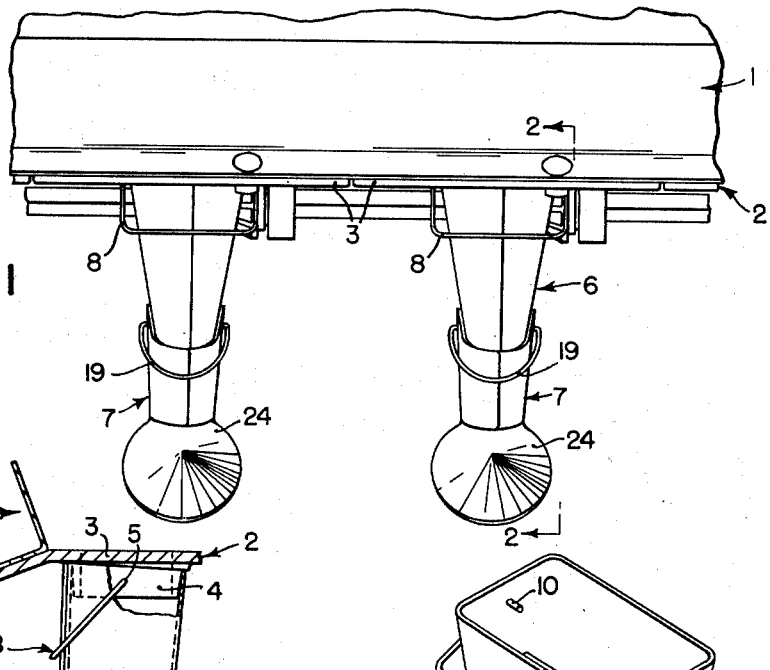
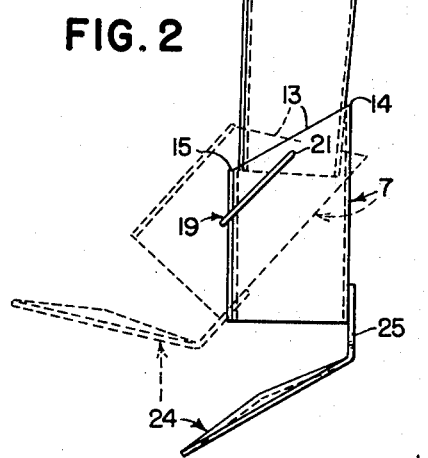
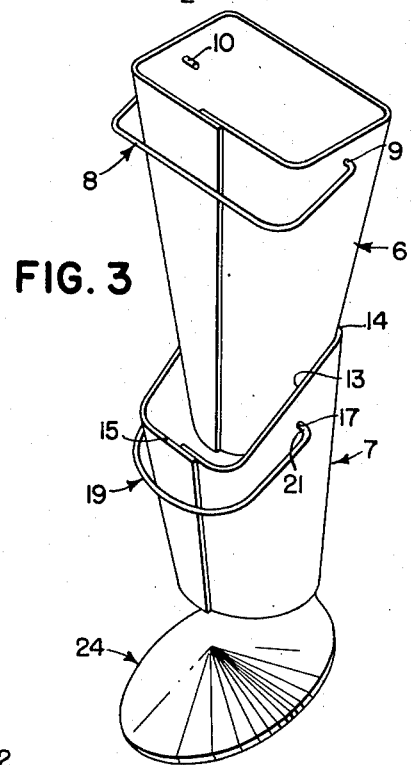
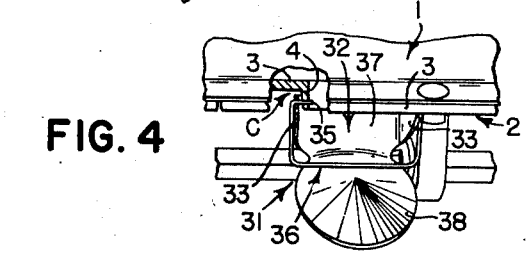
INVENTORS.
WILLIAM A. HYLAND
ROYCE R. BORNGRAEBER
ATTORNEYS

UNITED STATES PATENT OFFICE 2,614,850

FERTILIZER DISTRIBUTOR

William A. Hyland and Royce R. Borngraeber, Horicon, Wis., assignors to John Deere Van Brunt Company, Horicon, Wis., a corporation of Wisconsin Application February 25, 1950, Serial No. 146,358

1 Claim. (Cl. 275—14)

The present invention relates generally to agricultural implements and more particularly to fertilizer distributors.

The object and general nature of the present invention is the provision of distributing means which includes a plurality of hingedly mounted lower spout sections having secured to the forward wall of each of them a lower rearwardly and downwardly angled scatterer plate for distributing the fertilizer or other material rearwardly as well as laterally. The present invention further includes the feature of a lower spout section which is free to swing rearwardly and, vibrating under the effect of travel of the machine across a field, the lower scatterer plate serves to cause a substantially uniform distribution of the fertilizer and, moreover, being hinged to the upper spout, is free to swing rearwardly, whereby passage of the machine over obstructions or the like will not damage the spout sections or the scatterer plates carried thereby.

These and other objects and advantages of the present invention will be apparent to those skilled in the art after a consideration of the following detailed description of one preferred embodiment, taken in conjunction with the accompanying drawings illustrating said embodiment.

In the drawings:

Figure 1 is a fragmentary rear view of a portion of a fertilizer distributor in which the principles of the present invention have been incorporated;

Figure 2 is a side view of the spout and scatterer construction shown in Figure 1, being a view taken generally along the line 2—2 of Figure 1;

Figure 3 is a perspective view of the spout and scatterer construction shown in Figures 1 and 2; and Figure 4 is a modified form of the present invention, providing exceptionally high clearance for use on machines especially adapted to pass over ridges, terraces and the like.

Referring now to the drawings, particularly Figures 1-3, the fertilizer distributor in which the principles of the present invention have been incorporated includes a hopper or container 1 having a bottom 2, preferably formed of or including a plurality of feeder-wheel-carrying plates 3. Each of the plates 3 includes an opening through which fertilizer is discharged and a downwardly extending flanged portion 4 which is apertured at opposite sides, as at 5.

Associated with each of the bottom plates 3 is a spout construction which includes an upper tubular spout 6 and a lower oscillatable spout section 7. The upper end of the spout 6 is apertured to provide openings adapted to register with the openings 5 in the plate spout 4, and a spring ring 8 having ends 9 and 10 insertable through the openings in the parts 4 and 6 serves as means for rigidly connecting the upper portion of the upper spout 6 to the plate 3. To this end, the upper end of the spout 6 bears against the lower face of the plate 3.

The lower spout section 7 comprises a tubular part having its upper end 13 formed on a bevel so that the forward wall 14 is appreciably higher than the rear wall 15. The upper portion of the lower spout section 7 is apertured, as at 17, in each of its side wall portions, and the lower end of the upper spout 6 is likewise provided with apertures adapted to register with the apertures 17. These registering apertures are adapted to receive a spring ring 19 the ends 21 of which are insertable into the registering apertures just mentioned, thereby providing for a pivotal connection between the lower spout section 7 and the upper spout 6 whereby the lower spout section 7 may swing fore and aft about a generally transverse axis relative to the upper spout 6.

A scatterer plate 24 is provided with an upwardly extending bracket section 25 which is welded or otherwise fixed to the forward wall of the lower spout section 7 at the lower end of the latter. The plane of the scatterer plate 24 lies at an acute angle with respect to the axis of the lower spout section 7 and the plate 24 is dimensioned diametrically so that a considerable portion of the plate 24 lies rearwardly of the vertical plane passing upwardly through the axis of pivotal connection between the spout parts 6 and 7. The extent of overhang of the scatterer plate is sufficient to cause the lower spout section 7 normally to hang generally vertically, with the higher forward wall 14 abutting against the forward wall of the upper spout 6. However, since the upper edge of the rear wall 15 of the lower spout section 7 lies appreciably below the pivot axis established by the pin ends 21, the lower spout section 7 is free to swing rearwardly a substantial amount, sufficient to cause the lower spout section 7 and the scatterer plate 24 to pass over any obstructions or the like over which the distributor may be operated. Normally, the lower spout section 7 oscillates back and forth when the machine is driven across a field, generally between the full-line position shown in Figure 2, and the position shown in dotted lines, from which it will be noted that between both positions the scatterer plate 24 is angled rearwardly and downwardly. As a result of this construction fertilizer passing outwardly through the lower end of the lower spout section 7 will be diverted rearwardly as well as laterally by the scatterer plate 24. Furthermore, the upper edge of the rear wall 15 of each lower spout section 7 is disposed so that the lower spout section 7 can swing through approximately 45 degrees, to the position shown in dash-and-dot lines in Figure 2, whereby obstructions may be readily cleared, as mentioned above.

The high clearance scatterer shown in Figure 4 is quite similar to the spout and scatterer construction shown in Figures 1–3 and described above. In the form of the invention shown in Figure 4, the spout construction 31 comprises an upper generally semi-cylindrical part 32 having ends or lugs 33 apertured to receive the ends 35 of a spring snap ring 36, the ends 35 being extended through the openings 34 and into the openings 5 in the bottom plate spout section 4 for releasably holding the spout section 31 connected to the hopper. The front wall 37 of the spout section 31 carries a scatterer plate 38 which is substantially like that shown at 24 in Figures 1–3 and serves substantially the same purpose. The upper wall portion of the spout section 31 is formed so that there is a slight clearance C between the upper edges of the spout 31 and the bottom plate 3. This provides a relatively small amount of fore and aft swinging of the spout section 31 relative to the hopper, which is sufficient to provide the desired spreading and scattering action as the material falls through the spout section 31 onto the scatterer plate 38. Due to the fact that the high clearance spouts 31 are relatively short in their vertical dimension, it is unnecessary to provide the amount of rearward swinging action that is present in the form of the construction shown in Figures 1–3 since it is unlikely that the spouts 31 will ever encounter any obstructions.

While we have shown and described above the preferred structure, it is to be understood that our invention is not to be limited to the particular details shown and described above, but that, in fact, widely different means may be employed in the practice of the broader aspects of our invention.

What we claim, therefore, and desire to secure by Letters Patent is:

In a fertilizer distributor of the type including a hopper carrying distributing means including a substantially vertically disposed, generally tubular upper spout fixed to the bottom of the hopper, a substantially vertically disposed, generally tubular lower spout section, means pivotally connecting the upper end of said lower spout section to the lower end of said upper spout for movement relative to the latter about a generally transverse axis, a scatterer plate comprising a disk-like part appreciably larger diametrically than the lower end of said lower spout section, and means fixing the forward edge portion of said part to said lower spout section at the forward side thereof so that said plate lies below the lower end of said spout section and with an appreciably greater portion of the weight of said scatterer plate disposed rearwardly of the vertical plane passing transversely through said axis and substantially containing the axis of said lower spout section, whereby the lower spout section with said scatterer plate attached thereto is overbalanced so as to swing forwardly until the forward portion of said spout section at the upper end thereof engages the forward wall of said upper spout, said lower spout section and scatterer plate being free to swing rearwardly in the event they encounter an obstruction or the like during forward travel.

WILLIAM A. HYLAND.
ROYCE R. BORNGRAEBER.

REFERENCES CITED

The following references are of record in the file of this patent:

UNITED STATES PATENTS

| Number | Name | Date |
|---|---|---|
| 364,577 | Crane | June 7, 1887 |
| 555,897 | Crane | Mar. 3, 1896 |
| 2,162,689 | Mayfield | June 20, 1939 |

FOREIGN PATENTS

| Number | Country | Date |
|---|---|---|
| 43,628 | Australia | Aug. 25, 1910 |
| 568,971 | France | Jan. 2, 1924 |